Figure 1:
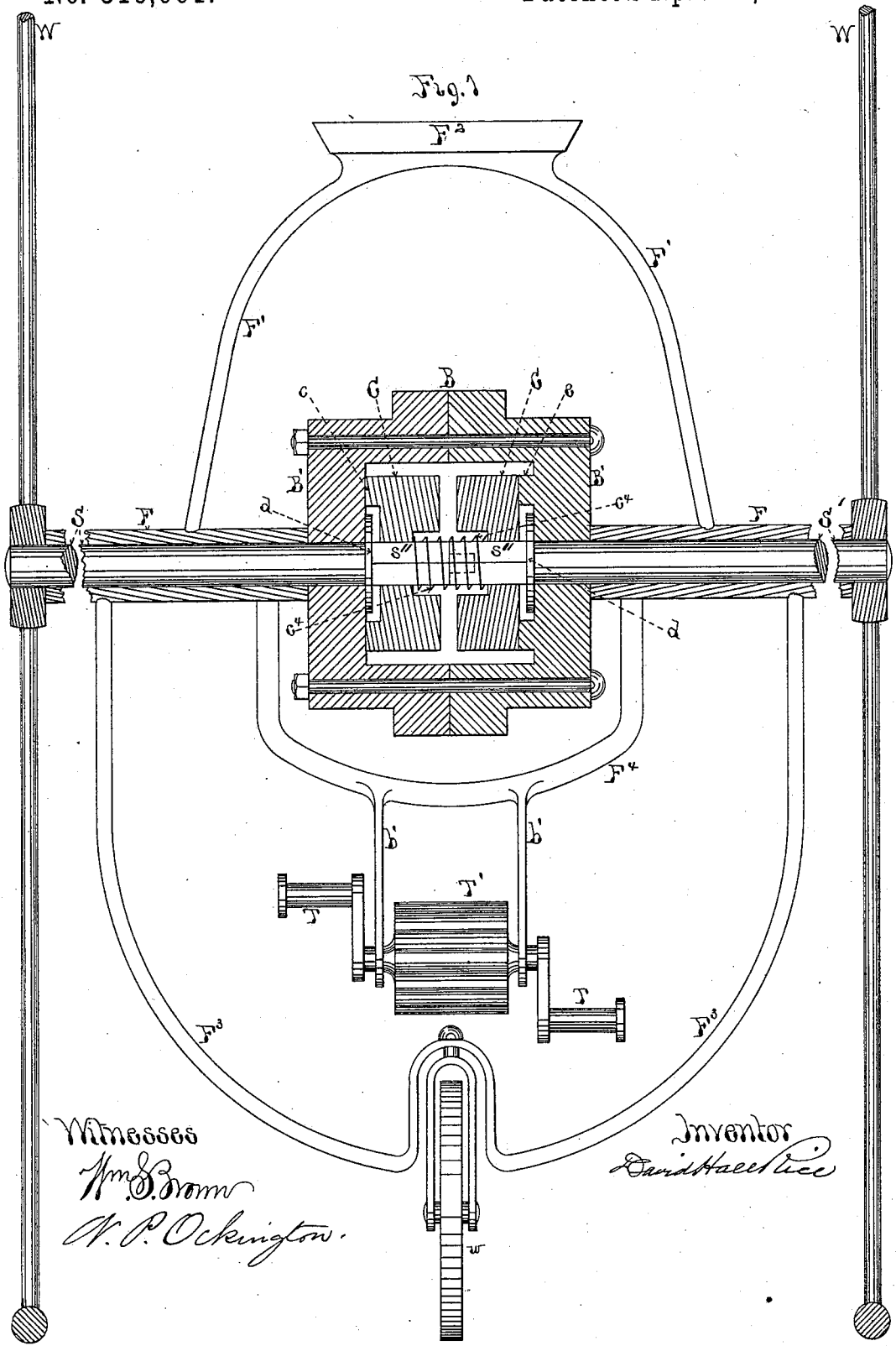

(No Model.) 2 Sheets—Sheet 2.
D. H. RICE.
CLUTCH FOR TRICYCLES.
No. 316,061. Patented Apr. 21, 1885.
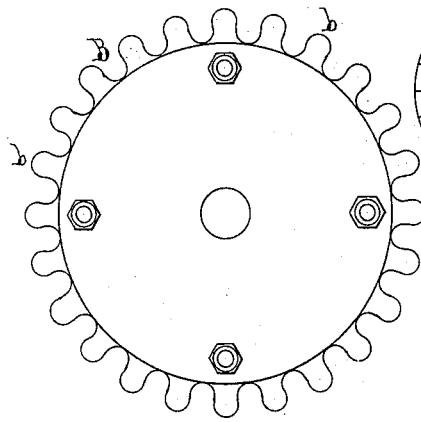
Fig. 2
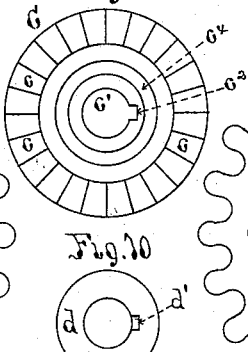
Fig. 9
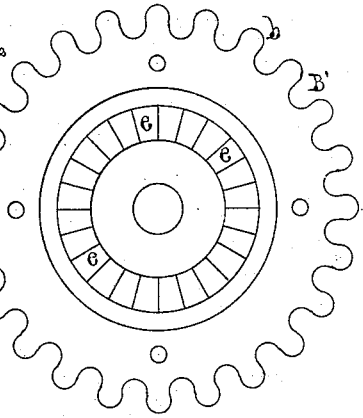
Fig. 3
Fig. 10
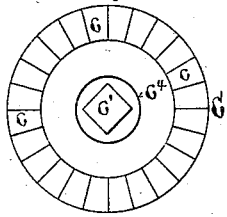
Fig. 4
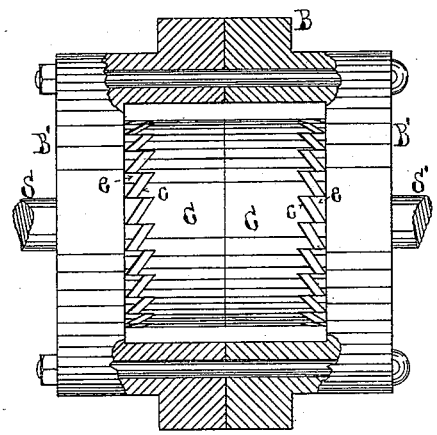
Fig. 6
Fig. 7
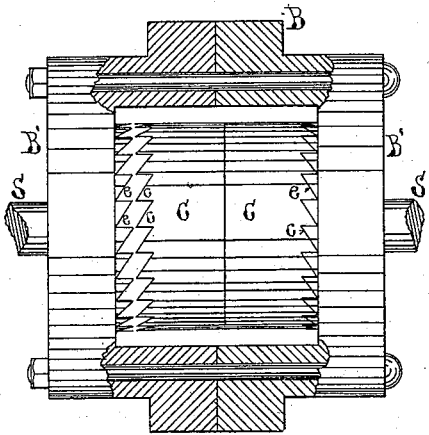
Fig. 5
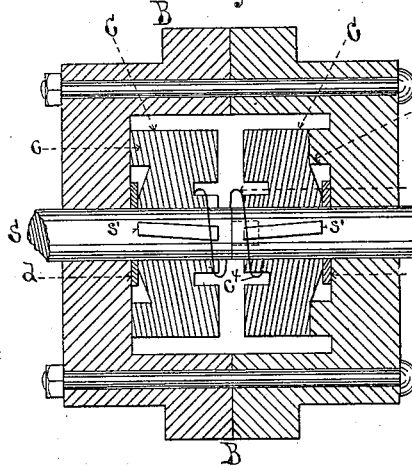
Fig. 8
Witnesses
Wm. S. Brown
N. P. Ockington
Inventor
David Hale Rice

UNITED STATES PATENT OFFICE.

DAVID HALL RICE, OF LOWELL, MASSACHUSETTS.

CLUTCH FOR TRICYCLES.

SPECIFICATION forming part of Letters Patent No. 316,061, dated April 21, 1885.

Application filed November 12, 1884. (No model.)

*To all whom it may concern:*

Be it known that I, DAVID HALL RICE, of the city of Lowell, in the county of Middlesex and State of Massachusetts, have invented a new and useful Improvement in Clutches for Tricycles and other Purposes, of which the following is a specification.

My improvement relates to clutches for taking hold and releasing of shafts to be driven by power applied to them, and is particularly adapted for use upon tricycles and other similar wheeled vehicles which are driven by a motive power carried by them; and it consists in the novel combination and arrangement of parts, substantially as hereinafter described and claimed.

In the drawings, Figure 1 is a rear view of a tricycle provided with my improved clutch in vertical transverse section. Fig. 2 is a side view of the clutch-box or outer casing. Fig. 3 is an internal face view of one-half of the clutch-box by itself. Fig. 4 is a face view of one of the clutches adapted for a square shaft. Fig. 5 is a side view of the clutch with the outer box partly broken away to show the internal construction. Fig. 6 is another view of the same, showing the clutches in a different position. Fig. 7 is a side view of one of the clutches. Fig. 8 is a vertical transverse section through the clutch mechanism, showing a modification in attaching the clutches to their shafts. Fig. 9 is a face view of one of the clutches shown in Fig. 8. Fig. 10 is a face view of one of the washers used, as shown in Fig. 8, to hold the axles in place in the frame.

W W' are the two large or driving wheels of the tricycle, and $w$ is the small or steering wheel of the same. It has been found desirable in turning curves with such a machine to have the wheels driven independently of each other, while in traveling on a straight track it is desirable to have both wheels driven positively, and it is for this purpose, more especially, that my improvement is devised. The steering-wheel $w$ may be provided with any well-known guiding attachment, or turned in its pivot-bearing in the frame F by hand, if desired; and further description of such steering attachment is unnecessary.

To each driving-wheel W W' is rigidly attached a shaft, S S', as shown, and these two shafts abut against each other at their inner ends and at the center of the machine. The end of one of these shafts is made to revolve and take a bearing in a socket in the end of the other by forming a projecting part on the former to fit such socket in the latter, as shown in dotted lines, and, as will be readily understood, so as to give greater steadiness of rotation to their ends. The shafts S S' are supported in the tubular frame-work pieces F F, which are rigidly connected together by the braces F' $F^3$ $F^4$, attached to the tubular parts in any common and well-known manner—as, for instance, by bolts or screws on the opposite face of the machine from that shown.

Around the shafts S S' and over the part where there ends abut I place the clutch-box B, made so as to turn freely upon the shafts which pass through axial holes in each half of the box. The shafts are cylindrical where they pass through the frame-pieces F F and sides of the box B. On each shaft is screwed, by a proper thread, a nut or washer, $d$, after the half of the box B is slipped over the shaft, thus serving to hold the box and shaft on each side together. The box B is formed of two halves, B' B', made alike and bolted together, as shown. Around the outer periphery of the box are formed the teeth $b\, b$, which are adapted to enter the links of an endless chain extending from and around the box B and the toothed wheel T', which is mounted on the shaft of the pedal-cranks T T in the ordinary manner. It will thus be seen that if nothing else than heretofore described prevented the box B would simply revolve around the shafts S S' as the treadles were operated. This is, however, prevented in the following manner: Within the box B the end of each shaft is made polygonal in form, as shown at S" S". On these ends of the shafts are slipped two clutches, C C, formed with ratchet-teeth on their faces, which come opposite the internal faces of the box B. In the internal face of each half of the box B' is formed a corresponding series of ratchet-teeth, as shown. The axial hole $c'$ in each clutch fits the square part of the shaft closely, but so as to allow the clutch to slip freely longitudinally on the shaft within the box. A cylindrical chamber, $c^4$, is also formed in the inner face of each clutch around the axial-hole, as shown. The rachet-teeth of the box and the two clutches being placed so as to project, as shown in Figs. 5 and 6, with relation to each other, a spiral spring is placed around the ends of the two shafts, so as to enter the chambers $c^4$, and, pressing against the clutches C C on either end, tends to keep them apart and cause their ratchet-teeth to engage with those in each inner face of the box, as shown. When the box B is revolved so as to turn the shafts S S' and wheels W W' forward, the clutches C C both engage with the rachet-teeth in the box B, as shown in Fig. 6, and both shafts and wheels will be driven positively forward. In driving the machine round a curve, however—as, for instance, to the right—the left-hand driving-wheel W, traveling the larger circle, would move faster than the right-hand one, W', and the clutch-box B. This would cause the clutch attached to its shaft S to move along its shaft and unlock itself from the ratchet-teeth on its side of the box by reason of the beveled inclines of the ratchet-teeth in the box and on the clutch slipping over each other. The wheel W would therefore move independently of the clutch-box B and the other wheel, W', until the curve was rounded, when its shaft would again automatically lock itself to the box. Of course all this is accomplished by having the space between the two clutches C C just sufficient, as shown, to allow one of the clutches to slide along toward the other far enough to unlock itself from the box B, as described, and shown in Figs. 1 and 5. Even if this space between the clutches were greater the same result would be accomplished, but by making it no greater than described I accomplish a second object of the invention as follows: When the clutch-box B is turned in the opposite direction from that heretofore supposed, or, in other words, so as to drive the wheels and their shafts and attached clutches backward, the beveled inclines of the ratchet-teeth on both sides of the box will, acting against the corresponding bevels of the ratchet-teeth of the clutches, force both clutches simultaneously inward on their shafts toward each other. Now, the space between the clutches, over which they must traverse to meet, is but a little greater than the depth of the ratchet-teeth on one clutch; hence when both clutches are thus forced inward simultaneously until they meet, the ratchet-teeth of neither one will be withdrawn from the corresponding teeth of the box B, and therefore both wheels will be driven positively backward as well as forward by the clutch.

Any washer or other tubular piece of metal may be placed between the clutches C C, if desired, provided the free space over which they and it can move be of the length described, such washer of course sliding freely on the shafts S S'.

It will thus be seen that the clutch mechanism drives both wheels positively forward and backward, but automatically releases one wheel in propelling the vehicle around curves, as described.

In Figs. 8, 9, and 10 a modification of the method of securing the clutches C C upon their shafts is shown, which greatly assists their operation in locking and unlocking automatically, as described. Instead of the ends of the shafts S S' being made square, splines $s'$ $s'$ are used, which are set in the shafts at a slight angle from the axis of the shaft, and so as to assist the movement of the clutch in unlocking itself from the box-ratchet, as before described. The hole $c'$ in the clutch is provided with a correspondingly-shaped groove, $c^2$, to fit over the spline $s'$ and prevent the wheel turning round. The number of these splines and grooves around the shaft and wheel may be increased, if desired, in which case they will be placed on opposite sides of the shaft. These splines are an equivalent of the square shaft in holding the clutches onto their shafts, except in the matter of their angling position, and they are set in grooves in the shaft in the ordinary way. The square ends of the shafts may be made to perform the same functions by making them slightly spiral as well as flat-faced, so that their corners will incline to the axis of the shaft in the same manner as the splines are shown. The splines $s'$ $s'$ also perform another function, as shown, for they are made to project into the washers $d$ $d$ where they touch them, a notch, $d'$, being cut in the proper position in the washer to receive the end of the spline. The washers $d$ $d$ are thus prevented from turning around or becoming loose on the shaft, and they may thus be used either with or without a screw-thread upon the shafts.

The annular chamber $c^4$, to receive the spiral spring, is shown in Fig. 8 as made in a slightly different position from that of Fig. 1, but it acts in the same way. Instead of a single spring bearing equally upon both clutches, springs attached to the shafts S S' may be used to press the clutches into engagement with the disks B' B'; but the former is preferred.

What I claim as new and of my invention is—

1. In combination with the shafts S S', the two disks B' B', revolving freely thereon and provided with ratchet-teeth $e$ $e$, and the clutches C C, attached to and capable of sliding longitudinally upon said shafts, each provided with the corresponding ratchet-teeth, $c$ $c$, and suitable mechanism for pressing the clutches against the disks, substantially as described.

2. In combination, the shafts S S', the disks B' B', provided with ratchet-teeth $e$ $e$, the clutches C C, provided with corresponding ratchet-teeth, $c$ $c$, and a single spring bearing with equal pressure outwardly upon said clutches, substantially as described.

3. In combination with the shafts S S', provided with angling splines $s'$ $s'$, the longitudinally-moving clutches C C, provided with corresponding angling grooves, $d'$, and with ratchet-teeth, $c$ $c$, and the revolving disks B' B', provided with corresponding ratchet-teeth, substantially as described.

4. In combination with the revolving box B, formed with teeth $b\ b$ around its periphery and with ratchet-teeth $e\ e$ on its internal faces, the shafts S S', and the longitudinally-sliding clutches C C attached thereto and provided with corresponding ratchet-teeth, $e\ e$, substantially as described.

5. The combination of the shafts S S', the disks B' B', provided with ratchet-teeth $e\ e$, the longitudinally-moving clutches C C, provided with similar teeth, $c\ c$, and having the length of space on said shafts between them over which they are capable of moving either singly or simultaneously toward each other less than the depth of the ratchet-teeth of both said clutches, substantially as described.

6. In combination with the disks B' B', provided with ratchet-teeth $e\ e$, the clutches C C, provided with corresponding teeth, $c\ c$, and the shafts S S', one of which is provided with a socket and the other with a projection revolving and taking a bearing in said socket, substantially as described.

7. In combination with the disks B' B', the shafts S S', splines $s'\ s'$, and collars $d\ d$, substantially as described.

DAVID HALL RICE.

Witnesses:
WILLIAM P. BLAKE,
N. P. OCKINGTON.